(12) United States Patent
Wang et al.

(10) Patent No.: US 7,853,966 B2
(45) Date of Patent: Dec. 14, 2010

(54) OPTICAL RECORDING AND/OR REPRODUCING APPARATUS WITH PROTECTION SHIELD

(75) Inventors: Yen-Wen Wang, Taipei Hsien (TW); Xue-Dong Tang, Shenzhen (CN); Tzu-Ping Yang, Taipei Hsien (TW)

(73) Assignees: Hong Fu Jin Precision Industry Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 753 days.

(21) Appl. No.: 11/858,912

(22) Filed: Sep. 21, 2007

(65) Prior Publication Data

US 2008/0155579 A1 Jun. 26, 2008

(30) Foreign Application Priority Data

Dec. 22, 2006 (CN) .................... 2006 1 0157878

(51) Int. Cl.
*G11B 7/00* (2006.01)

(52) U.S. Cl. .................................... 720/671

(58) Field of Classification Search .......... None
See application file for complete search history.

(56) References Cited

U.S. PATENT DOCUMENTS

| | | | |
|---|---|---|---|
| 6,005,836 A | 12/1999 | Choi | |
| 6,385,161 B1* | 5/2002 | Begley | 720/671 |
| 6,388,980 B2* | 5/2002 | Otani et al. | 720/603 |
| 6,430,143 B1* | 8/2002 | Kajiyama et al. | 720/671 |
| 6,442,121 B1* | 8/2002 | Tezuka et al. | 720/648 |
| 6,772,428 B2 | 8/2004 | Kim et al. | |
| 6,922,836 B2* | 7/2005 | Watanabe | 720/601 |
| 7,103,895 B2* | 9/2006 | Osada et al. | 720/671 |
| 7,308,693 B2* | 12/2007 | Lee | 720/675 |
| 7,350,220 B2* | 3/2008 | Obata et al. | 720/671 |
| 7,526,781 B2* | 4/2009 | Wang et al. | 720/671 |
| 7,577,969 B2* | 8/2009 | Chen et al. | 720/689 |
| 2005/0052974 A1 | 3/2005 | Iida et al. | |

* cited by examiner

*Primary Examiner*—Mark Blouin
(74) *Attorney, Agent, or Firm*—Frank R. Niranjan

(57) ABSTRACT

According to another aspect, an optical recording and/or reproducing apparatus includes a frame, a spindle motor, a pair of parallel guide rails, an optical pickup head, and a shield mounted on the guide rails. The shield extends a protection surface higher than a lens of the optical pickup head. The protection surface is in an optical disc region and lowers than the optical disc when the optical disc is supported on the spindle motor.

14 Claims, 5 Drawing Sheets

OPTICAL RECORDING AND/OR REPRODUCING APPARATUS WITH PROTECTION SHIELD

BACKGROUND OF THE INVENTION

1. Field of the Invention

The present invention generally relates to optical recording and/or reproducing apparatus, and, more particularly, to an optical recording and/or reproducing apparatus with a protection shield.

2. Description of Related Art

In general, an optical pickup records or reproduces information while moving across a recording medium such as a disc. The optical pickup includes an objective lens, which focuses light emitted from a light source and forms an optical spot on the disc. The objective lens is installed in an actuator capable of moving the objective lens in a radial direction and a focus direction of the disc such that the optical spot can be formed on a correct position on a track of the disc.

However, when the disc is in a warped state or inclined with respect to the objective lens, the disc tends to contact the optical pickup. Therefore, the optical disc and the optical pickup head are prone to be scratched and cannot work normally.

Accordingly, a need exists for an optical recording and/or reproducing apparatus resolving the above problem in the industry.

SUMMARY OF THE INVENTION

According to one aspect, an optical recording and/or reproducing apparatus, which is used for reading and/or writing an optical disc, includes a frame, at least one guide rail, an optical pickup head, and a shield mounted on the at least one guide rail. The optical pickup head is moveably sleeved on the at least one guide rail. The optical pickup head defines an upper surface. The shield extends at least one protection surface higher than the upper surface of the optical pickup head. The at least one protection surface is under the optical disc when the optical disc is supported on the spindle motor.

According to another aspect, an optical recording and/or reproducing apparatus includes a frame, a spindle motor, a pair of parallel guide rails, an optical pickup head, and a shield mounted on the guide rails. The shield extends at least one protection surface higher than a lens of the optical pickup head. The at least one protection surface is in an optical disc region and lower than the optical disc when the optical disc is supported on the spindle motor.

Other systems, methods, features, and advantages of the present optical recording and/or reproducing apparatus will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present optical recording and/or reproducing apparatus can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe preferred embodiments of a present optical recording and/or reproducing apparatus, in detail.

Figure 1:
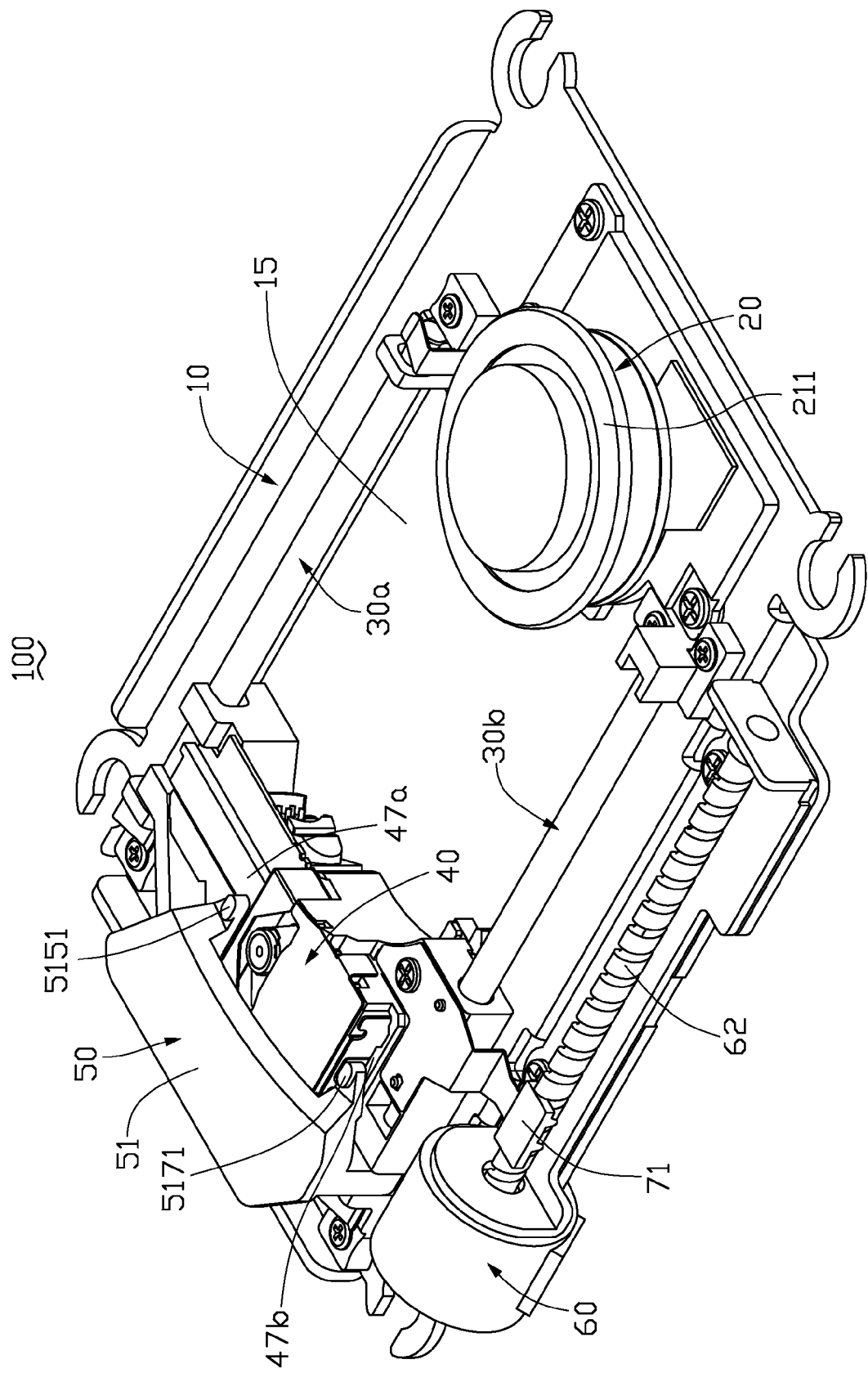
FIG. 1 is an isometric view of an optical recording and/or reproducing apparatus in accordance with an exemplary embodiment.

Referring to FIG. 1, an optical recording and/or reproducing apparatus 100 in accordance with an exemplary embodiment is illustrated. The optical recording and/or reproducing apparatus 100 includes a frame 10, a spindle motor 20, a pair of guide rails 30*a*, 30*b*, an optical pickup head 40, a shield 50, and a feeding motor 60. The spindle motor 20, the guide rails 30*a*, 30*b*, the optical pickup head 40, and the shield 50 are mounted on the frame 10 to cooperatively record or reproduce data on an optical disc.

The frame 10 defines a substantially rectangular opening 15 in a center of the frame 10. The spindle motor 20 and the shield 50 are disposed on opposite sides of the frame 10, and the guide rails 30*a*, 30*b* are disposed on another opposite sides of the frame 10. The spindle motor 20, the guide rail 30*a*, the shield 50, and the guide rail 30*b* sequentially surround the opening 15. The guide rails 30*a*, 30*b* are parallel to each other, and the optical pickup head 40 is slideably supported on the guide rails 30*a*, 30*b*. The feeding motor 60 is positioned at a side of the guide rail 30*b* for driving a worm gear 62. The worm gear 62 is parallel with the guide rail 30*b* and engages with the optical pickup head 40 through a gear set 71 to drive the optical pickup head along the guide rails 30*a*, 30*b*.

Figure 2:
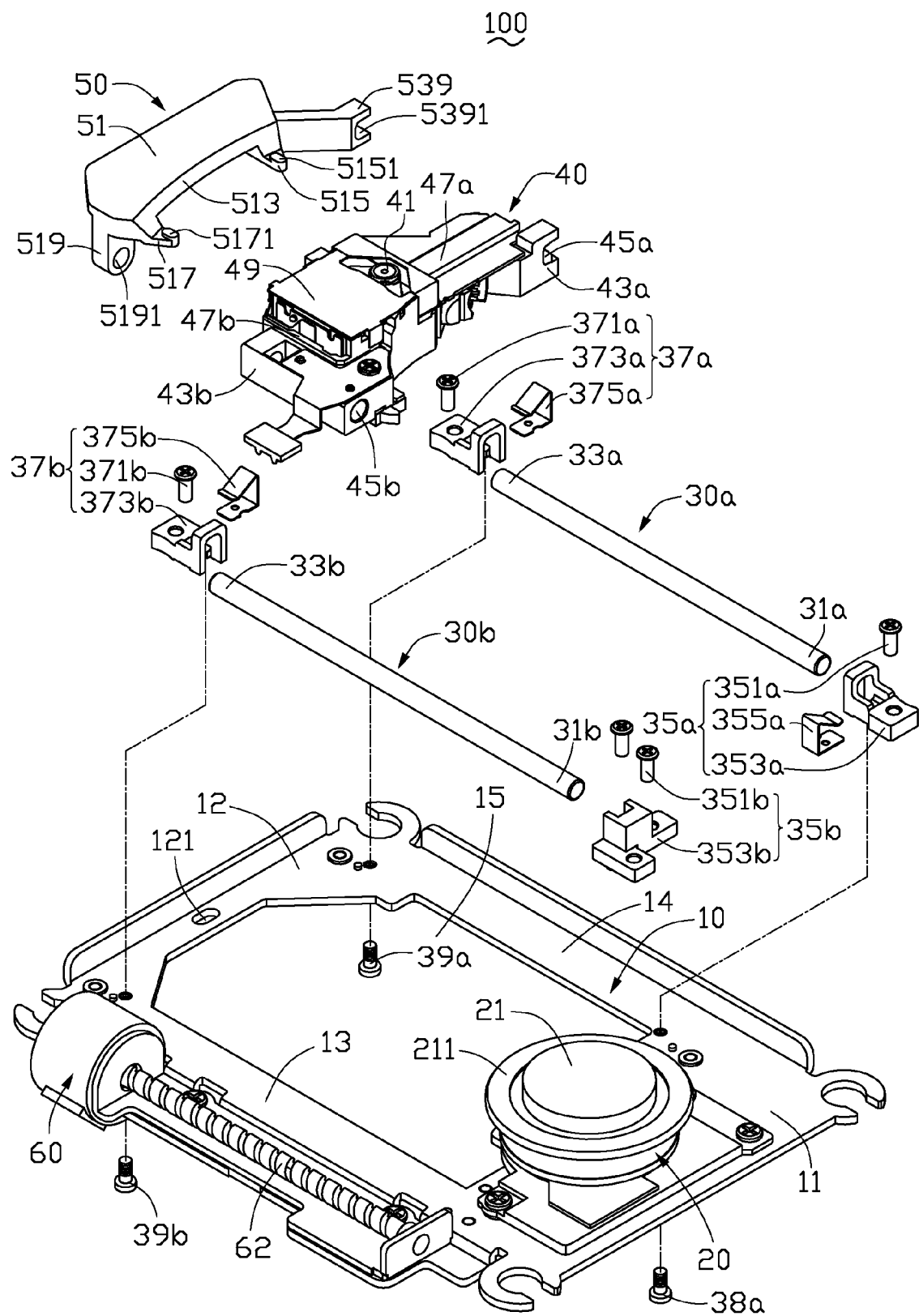
FIG. 2 is an exploded, isometric view of the optical recording and/or reproducing apparatus of FIG. 1.

Referring to FIG. 2 together with FIG. 1, an exploded view of the optical recording/reproducing apparatus 100 is illustrated. The frame 10 includes a first edge 11, a second edge 12, a third edge 13, and a fourth edge 14. The first and the second edges 11, 12 are on opposite sides of the frame. The third and the fourth edges 13, 14 are on another opposite sides of the frame. The first, second, third, and fourth edges 11, 12, 13, 14 surrounds the opening 15.

The spindle motor 20 is mounted on the first edge 11 adjacent to the opening 15 with a plurality of screws (not labeled). A top of the spindle motor 20 forms a turntable 21. The turntable 21 is used to rotate the optical disc positioned on an annular supporting surface 211 of the turntable 21.

The guide rails 30*a*, 30*b* are respectively mounted on the third and fourth edges 13, 14 via rail holders 35*a*, 35*b*, 37*a*, 37*b* correspondingly. The guide rails 30*a*, 30*b* are distributed at opposite sides of the spindle motor 20 and perpendicular to a rotating axis of the spindle motor 20. A first end 31*a* of the guide rail 30*a* is held in place by rail holder 35*a* and a second end 33*a* is held in place by rail holder 37*a*. Similarly a first end 31*b* and a second end 33*b* are respectively held in place by rail holder 35*b*, 37*b*. Each of the rail holders 35*a*, 37*a*, 37*b* includes a fixing screw 351*a*, 371*a*, 371*b*, a mounting seat 353*a*, 373*a*, 373*b*, and a resilient clip 355*a*, 375*a*, 375*b* respectively. The rail holder 35*b* includes a pair of fixing screws 351*b* and a mounting seat 353*b*. Corresponding ends 31*a*, 31*b*, 33*a*, 33*b* of the guide rails 30*a*, 30*b* are inserted into mounting seats 353*a*, 353*b*, 373*a*, 373*b* correspondingly, and each mounting seat 353*a*, 353*b*, 373*a*, 373*b* is secured to the frame 10 by fixing the screws 351*a*, 351*b*, 371*a*, 371*b* correspondingly. The ends 31*a*, 33*a*, 33*b* are correspondingly clipped by the resilient clips 355*a*, 375*a*, 375*b*. Three adjusting screws 38*a*, 39*a*, 39*b* are screwed through the frame 10 from beneath to support ends 31*a*, 33*a*, 33*b* correspondingly. The rail holder 35*b* is fixed, and a tilt of the guide rails 30*a*, 30*b* are adjustable by turning the adjusting screws 38*a*, 39*a*, 39*b* correspondingly.

The optical pickup head 40 includes a lens 41 for converging a laser beam from the optical pickup head 40 on the optical disc, thus recording/reproducing information to/from the optical disc. A first U-shaped notch 45*a* and a first round through hole 45*b* are correspondingly defined at two lateral sides of the optical pickup head 40. A size and shape of the first U-shaped notch 45*a* and the first round through hole 45*b* corresponds to the guide rails 30*a*, 30*b* to allow the guide rails 30*a*, 30*b* to be slidably received in the first U-shaped notch 45*a* and the first round through hole 45*b* correspondingly, thereby, guiding a movement of the optical pickup head 40.

Figure 3:
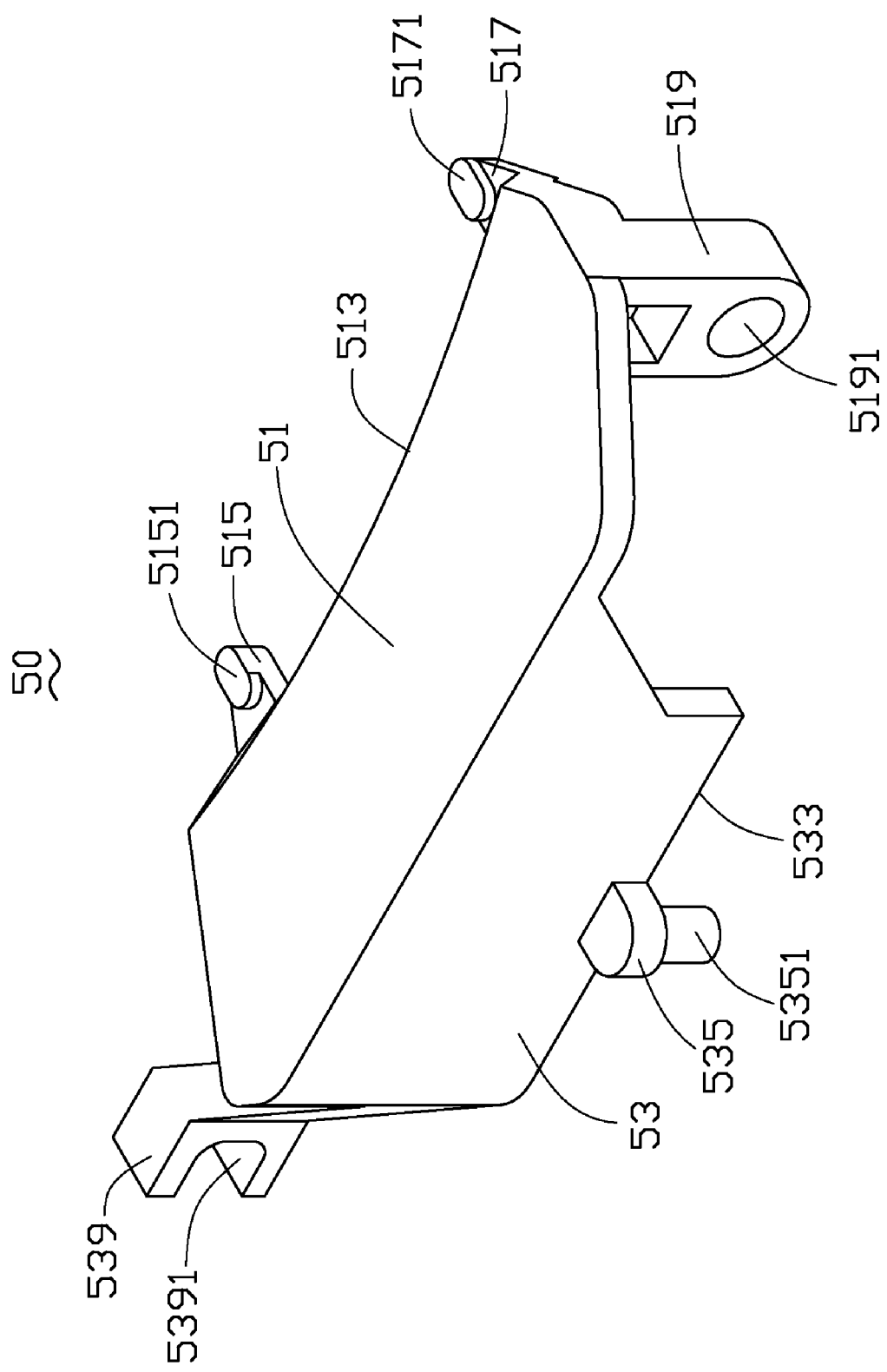
FIG. 3 is an enlarged, isometric view of a shield in FIG. 1.

Referring also to FIG. 3, the shield 50 includes a main body 51 with an arced edge 513 facing the spindle motor 20. A first arm 519 and a second arm 539 correspondingly extend from two lateral sides of the main body 51. A second U-shaped notch 5391 and a second round through hole 5191 are correspondingly defined in the second arm 539 and the first arm 519. The second U-shaped notch 5391 and the second round through hole 5191 are configured to receive the guide rail 30*a*, 30*b* correspondingly. A protrusion 535 with a post 5351 extending downwards is formed on an outer wall 53 of the main body 51. The post 5351 can be received in a restriction hole 121 defined in the second edge 12. A first protection portion 515 and a second protection portion 517 extend from opposite ends of the arced edge 513 toward the spindle motor 20. A first platform 5151 and a second platform 5171 are respectively formed on the first protection portion 515 and the second protection portion 517. The first platform 5151 and the second platform 5171 respectively protrude from the first protection portion 515 and the second protection portion 517. The first platform 5151 and the second platform 5171 are configured to be positioned higher than an upper surface 49 of the optical pickup head 40, but lower than the supporting surface 211 of the spindle motor 20 for supporting an edge of the optical disc disposed on the turntable 21.

The feeding motor 60 is mounted on the third edge 13 of the frame 10 for engaging with the optical pickup head 40 and providing a driving force for the optical pickup head 40. The worm gear 62 engages with the gear set 71 protruding from a lateral side of the optical pickup head 40, thus driving the optical pickup head to move linearly along the guide rails 30*a*, 30*b*.

Referring back to FIG. 1, a detailed assembly procedure of the optical recording and/or reproducing apparatus 100 will be described. First, the spindle motor 20 is secured to the first edge 11 of the frame 10 by screws, and the feeding motor 60 is secured to the third edge 13 by screws. The guide rails 30*a*, 30*b* respectively extend through the first U-shaped notch 45*a* and the first round through hole 45*b* in the optical pickup head 40. Consequently, the second ends 33*a* and 33*b* of the guide rails 30*a*, 30*b* respectively extend through the second U-shaped notch 5391 and the second round through hole 5191 in the shield 50. The mounting seats 353*a*, 353*b*, 373*a*, 373*b* of the rail holders 35*a*, 35*b*, 37*a*, 37*b* are correspondingly sleeved on the first ends 31*a*, 31*b* and the second ends 33*a*, 33*b*. The resilient clips 355*a*, 375*a*, 375*b* are respectively positioned to the mounting seats 353*a*, 373*a*, 373*b* for clipping the ends of the guide rails 30*a*, 30*b*. The fixing screws 351*a*, 351*b*, 371*a*, 371*b* are screwed to the frame 10 to secure the seats 353*a*, 353*b*, 373*a*, 373*b* and thus the guide rails 30*a*, 30*b* are mounted to the frame 10. When screwing the fixing screws 351*a*, 351*b*, 371*a*, 371*b*, the post 5351 of the shield 50 is inserted into the restriction hole 121 in the second edge 12. Thus, the shield 50 is disposed at the second ends 33*a*, 33*b* and immoveable with respect to the guide rails 30*a*, 30*b*.

After the above assembly procedure, the adjusting screws 38*a*, 39*a*, 39*b* are screwed to adjust heights of the first end 31*a* and the second ends 33*a*, 3*b* so as to adjust a parallelism of the guide rails 30*a*, 30*b*, and a parallelism of the optical pickup head 40 and the spindle motor 20. The fixing screws 351*b* are used to fix the first end 31*b*. During the adjustment of the adjusting screws 38*a*, 39*a*, 39*b*, the shield 50 is lifted, lowered, or deflected together with the optical pickup head 40 until the spindle motor 20 and the optical pickup head 40 are parallel with each other.

Figure 4:
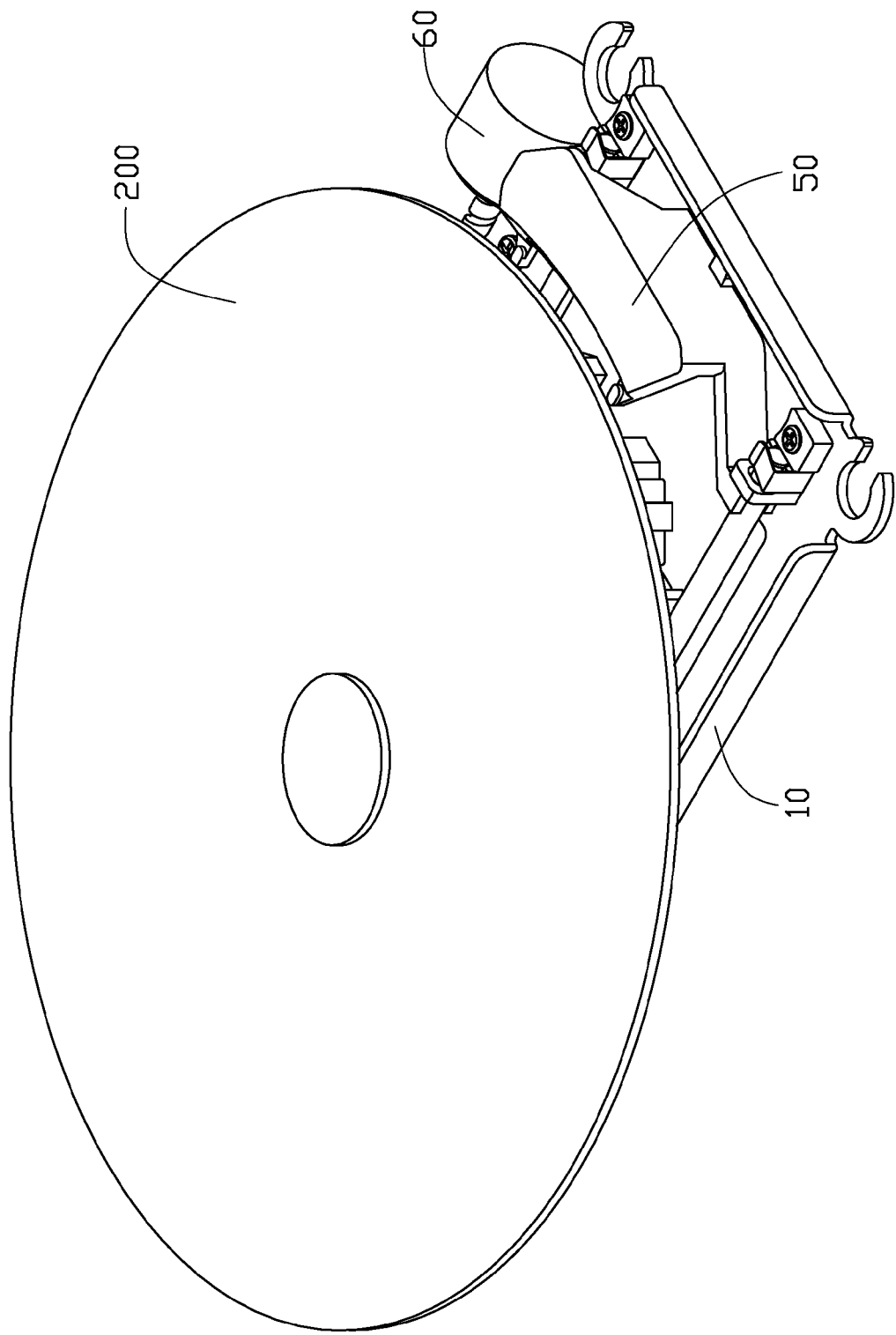
FIG. 4 is an isometric view of the optical recording and/or reproducing apparatus with an optical disc disposed thereon.
Figure 5:
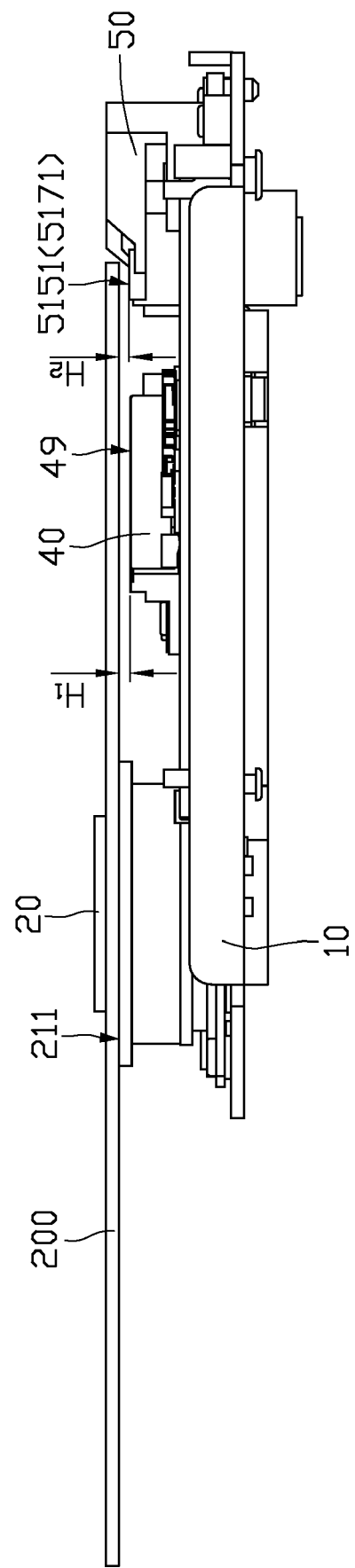
FIG. 5 is a side view of FIG. 4

Referring to FIGS. 4 and 5, assuming an optical disc 200 is balancedly positioned on the spindle motor 20 of the optical recording and/or reproducing apparatus 100, a first height distance H1 between the optical disc 200 and the upper surface 49 of the optical pickup head 40 is larger than a second height distance H2 between the optical disc 200 and the first platform 5151 (or the second platform 5171) of the shield 50. It is preferred that a height different (H1−H2) between the first height distance H1 and the second height distance H2 is to be from 0.06 millimeter to 0.14 millimeter. As the shield 50 is mounted on the guide rails 30*a*, 30*b* together with the optical pickup head 40, the height difference (H1−H2) remains constant no matter how the guide rails 30*a*, 30*b* are adjusted.

When the optical disc 200 inclines during rotation, the inclined optical disc 200 will first reach the first platform 5151 and/or the second platform 5171 of the shield 50, because the first platform 5151 and the second platform 5171 are higher than the upper surface 49 of the optical pickup head 40. Therefore, direct contact or impact between the optical disc 200 and the optical pickup head 40 is sufficiently avoided. The optical disc 200 and the optical pickup head 40 are effectively protected.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An optical recording and/or reproducing apparatus for reading and/or writing an optical disc, the optical recording and/or reproducing apparatus comprising:
   a frame;
   a spindle motor mounted on the frame for supporting and rotating the optical disc;
   a feeding motor mounted on the frame at a side of the spindle motor for outputting a driving force;
   at least one guide rail parallel to the feeding motor secured on the frame;

an optical pickup head for emitting a laser beam via a lens toward the optical disc to read and/or write to the optical disc, the optical pickup head being moveably sleeved on the at least one guide rail and engaged with the feeding motor to be driven along radial directions of the optical disc by the driving force, the optical pickup head defining an upper surface; and a shield mounted on the at least one guide rail, the shield extending at least one protection surface higher than the upper surface of the optical pickup head, the at least one protection surface being under the optical disc when the optical disc being supported on the spindle motor.

2. The optical recording and/or reproducing apparatus as claimed in claim 1, wherein the at least one protection surface is 0.06 millimeter to 0.14 millimeter higher than the upper surface of the optical pickup head.

3. The optical recording and/or reproducing apparatus as claimed in claim 1, wherein the shield extends two protection surfaces toward the spindle motor, and the two protection surfaces are located at two lateral sides of the lens of the optical pickup head.

4. The optical recording and/or reproducing apparatus as claimed in claim 3, wherein two guide rails are disposed at two lateral sides of the optical pickup head, and the optical pickup head sleeves on the guide rails for guiding movement thereof.

5. The optical recording and/or reproducing apparatus as claimed in claim 4, further comprising four rail holders securing ends of the guide rails.

6. The optical recording and/or reproducing apparatus as claimed in claim 5, wherein one of the four rail holders is a fixing suit for fixing one end of the guide rails and the other three suits are adjusting suits for adjusting heights of the other three ends of the guide rails.

7. The optical recording and/or reproducing apparatus as claimed in claim 6, wherein the fixing suit comprises a mounting seat for accommodating the corresponding end of the guide rails and a pair of screws for fixing the corresponding end and the mounting seat to the frame.

8. The optical recording and/or reproducing apparatus as claimed in claim 6, wherein each adjusting suit comprises a mounting seat for accommodating the corresponding end of the guide rails, a resilient clip for resiliently pressing the corresponding end, and an adjusting screw for adjusting height of the corresponding end.

9. An optical recording and/or reproducing apparatus for reading and/or writing an optical disc, the optical recording and/or reproducing apparatus comprising:

a frame;

a spindle motor mounted on the frame for supporting and rotating the optical disc;

a feeding motor mounted on the frame at a side of the spindle motor for outputting a driving force;

a pair of parallel guide rails disposed at two sides of the spindle motor, the guide rails secured to the frame by rail holders;

an optical pickup head for emitting a laser beam toward the optical disc and converging the laser beam by a lens on to the optical disc to read and/or write the optical disc, the optical pickup head being moveably sleeved on guide rails and engaged with the feeding motor to be driven along radial directions of the optical disc by the driving force; and a shield mounted on the guide rails, the shield extending at least one protection surface higher than the lens of the optical pickup head, the at least one protection surface being in the optical disc region and lower than the optical disc when the optical disc being supported on the spindle motor.

10. The optical recording and/or reproducing apparatus as claimed in claim 9, wherein the rail holders comprise a fixing suit for fixing one end of the guide rails and three adjusting suits for adjusting heights of other three ends of the guide rails.

11. The optical recording and/or reproducing apparatus as claimed in claim 10, wherein each adjusting suit comprises a mounting seat for accommodating the corresponding end of the guide rails, a resilient clip for resiliently pressing the corresponding end, and an adjusting screw for adjusting the height of the corresponding end.

12. The optical recording and/or reproducing apparatus as claimed in claim 10, wherein the fixing suit comprises a mounting seat for accommodating the corresponding end of the guide rails and a pair of screws for fixing the corresponding end and the mounting seat to the frame.

13. The optical recording and/or reproducing apparatus as claimed in claim 9, wherein the at least one protection surface is 0.06 millimeter to 0.14 millimeter higher than the lens of the optical pickup head.

14. The optical recording and/or reproducing apparatus as claimed in claim 9, wherein the shield comprises a post extending downward, and the post is received in a restriction hole defined in the frame to hold the shield at the distal ends of the guide rails with respect to the spindle motor.

* * * * *